Dec. 15, 1970 J. E. MOORE 3,548,217
TRANSISTOR SWITCH
Filed Sept. 19, 1967

INVENTOR
James E. Moore
BY Anderson, Luedeka, Fitch, Even, & Tabin
ATTORNEYS

United States Patent Office 3,548,217

Patented Dec. 15, 1970

3,548,217

TRANSISTOR SWITCH

James E. Moore, El Cajon, Calif., assignor, by mesne assignments, to Stromberg Datagraphics, Inc., San Diego, Calif., a corporation of Delaware Filed Sept. 19, 1967, Ser. No. 668,905
Int. Cl. H03k *17/00*
U.S. Cl. 307—254 8 Claims

ABSTRACT OF THE DISCLOSURE

An input transistor receives a control signal and alternately switches two output transistors by means of a current-controlling circuit. Each output transistor, when conductive, has forward currents through each junction, producing balanced voltage drops thereacross. Clamping and biasing provisions enable the circuit to switch bipolar as well as unipolar input signals.

The present invention relates to transistor switching circuits, and particularly to such switching circuits of the type capable of performing a double-throw relay function.

Switching devices of the above type have long been known and used in various electronic applications in conjunction with, for example, digital-to-analog converters, signal choppers, signal commutators and samplers. Transistor switching circuits of relatively little complexity heretofore used for such purposes have generally been limited to operation with an input or reference voltage of only a single polarity, e.g., extending from zero to a maximum value in only one direction. Thus, such circuits have not been easily or practicably usable with the wide range or variety of voltage functions sometimes required. Additionally, in prior art transistor switching circuits, a significant voltage difference or offset voltage develops between the input and output terminals of the circuit during conduction. Further, the offset voltage tends to vary substantially with changes in load or input signal, and to generally increase with even a small amount of load current.

It is an object of the present invention to provide a transistor switching circuit obviating, for practical purposes, the above-mentioned limitations heretofore present, and particularly in a manner requiring a relatively uncomplicated circuit arrangement and only a minimum of components.

Another object of the present invention is the provision of a transistor switching circuit which provides an extremely low and constant value of offset voltage, as well as having the capability of switching a bi-polar or unipolar signal.

Figure 1:
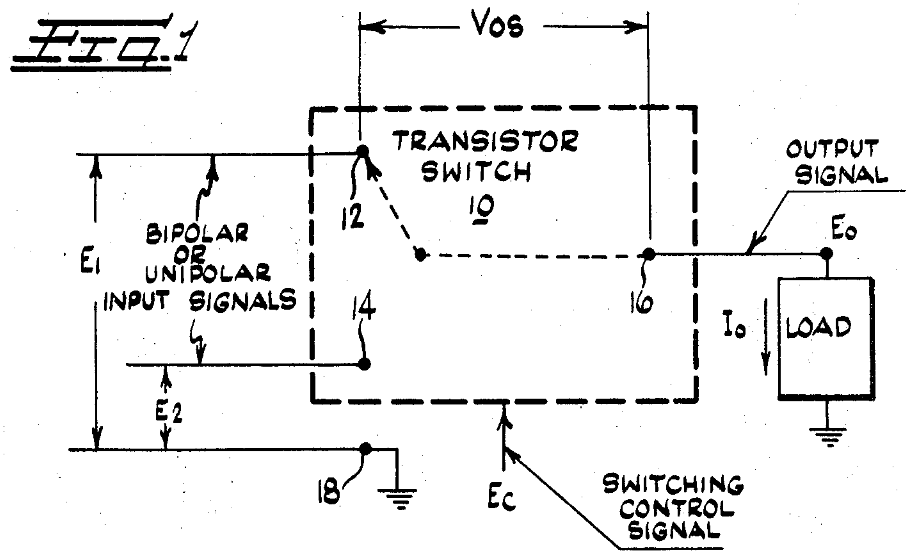
Figure 2:
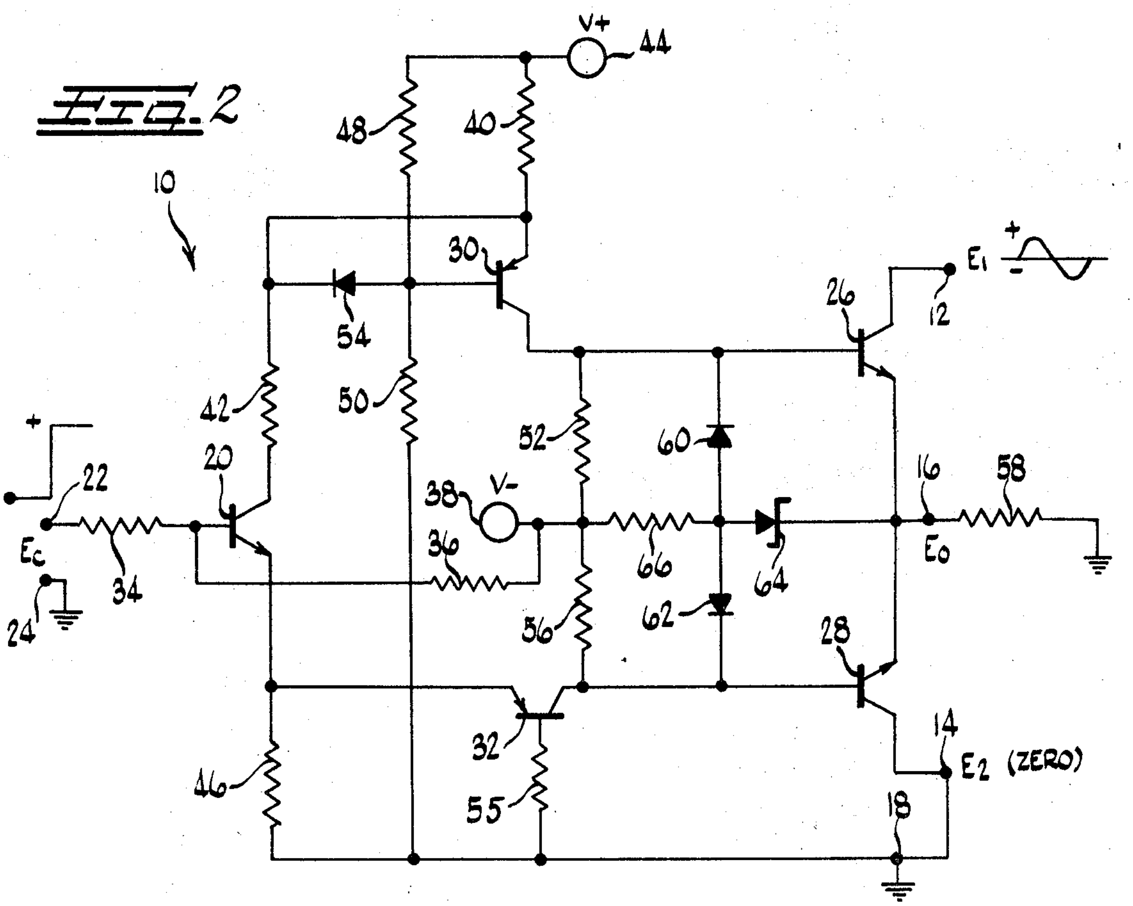

Other objects and advantages of the invention are more particularly set forth in the following detailed description, and in the accompanying drawing, of which:

FIG. 1 is a block diagram functionally representing the general operation of the switching circuit in accordance with the invention; and FIG. 2 is an electrical schematic diagram showing a preferred embodiment of the invention.

Referring now to FIG. 1, there is generally shown a double-throw, single-pole transistor switch 10 in highly schematic or block form. The switch 10 has two input terminals 12 and 14, and an output terminal 16. Input signal potentials $E_1$ and $E_2$ are respectively connected across each of the two input terminals 12 and 14 and a common or ground terminal 18. A switching control signal $E_c$ causes the selective switching and connection of either input terminal to the output terminal 16, and consequently the output signal $E_0$ will equal the particular one of the input signals connected to the output terminal, less the offset voltage $V_{os}$.

A circuit in accordance with a preferred embodiment of the invention is shown in FIG. 2, and comprises, generally, a two-state switching means, illustrated as including a transistor 20, which is responsive to the control signal $E_c$ coupled to the control signal terminals 22 and 24. The control signal $E_c$ selectively determines the state of the switching or control transistor 20, which directs or controls the operation of two output transistors 26 and 28 through current control means, illustrated as including constant current transistors 30 and 32, which are responsive to the control transistor 20 and provide substantially constant currents through the control or base electrodes of either output transistor 26 or output transistor 28, depending on the particular state of the control transistor 20. Thus, output transistors 26 and 28 are each alternately conductive or "on," while the other is non-conductive or "off," the input signal applied to the conductive transistor being supplied at output terminal 16. The current control means, as will be described in detail hereinafter, includes means for providing a substantially constant magnitude of current to each alternately conductive output transistor to produce forward currents across both of the transistor junctions and substantially balanced voltage drops thereacross, so that the offset voltages produced across the input and output electrodes of the conductive one of the output transistors, illustrated respectively as the collector and emitter, are minimized when the electrical inputs are applied to the input terminals 12 and 14.

More particularly, as shown in FIG. 2, the input or reference signal $E_1$, which is applied to the input terminal 12, is a bi-polar sinusoidal wave. However, it may alternatively be a D.C. potential or an A.C. potential, periodic or aperiodic. The other input signal $E_2$ is shown to be a constant zero potential, and thus the input terminal 14 is connected directly to ground at 18. The switching control signal $E_c$ is shown applied across terminals 22 and 24, and has two possible values, conveniently being zero and a predetermined positive voltage as shown, although, of course, any step voltage signal may be used, depending on the switching requirements of the circuit.

The switching control signal $E_c$ at terminal 22 is applied to the two-state switching or control means, which includes the control transistor 20, illustrated as an NPN type, by connection to the base thereof through a coupling resistor 34. The base of this control transistor is normally (i.e., with no applied control signal) negatively biased by a resistor 36 coupled to a negative supply voltage V— at terminal 38. Serially connected resistors 40 and 42 connect the collector electrode of the control transistor 20 to a positive voltage source V+ at terminal 44, and a resistor 46 couples the emitter electrode to ground. With this biasing arrangement, the control transistor 20 is nonconducting or OFF, when the control signal is at its zero potential, and conducting or ON when the control signal is at its positive potential.

The control transistor 20 controls the pair of constant current transistors 30 and 32, the upper (as shown) constant current transistor 30 being ON and the lower transistor 32 being OFF when the control transistor 20 is OFF. The upper constant current transistor 30 is rendered OFF and the lower ON when the control transistor 20 is ON. More particularly, the junction between the serially connected resistors 40 and 42 is connected to the emitter of the upper constant current transistor 30, which is of the PNP type, thereby biasing the emitter at a high positive or low positive potential, respectively, in accordance with the non-conduction and conduction of the control transistor 20.

The base of the upper constant current transistor 30 is maintained at a fixed positive reference potential which is between the high positive and low positive voltages of the emitter by connecting the base to the junction of a pair of series connected resistors 48 and 50, which are connected across V+ and ground. Thus, the base-emitter junction of the upper constant current transistor 30 is forward biased and the transistor is conducting or ON whenever the control transistor is non-conducting or OFF. The collector of the upper constant current transistor 30 is reverse-biased by resistor 52, of relatively high resistance, connected to V− at terminal 38. A unidirectional current conducting means, illustrated as a clamping diode 54, is connected across the base and emitter of the constant current transistor 30 to clamp its reverse base-emitter voltage to a relatively low value during conduction of the control transistor 20.

The lower constant current transistor 32 is controlled through the emitter circuit of the control transistor 20. More particularly, the constant current transistor 32, which is of the PNP type, is connected in a common base configuration with a base resistor 55 connecting the base electrode to ground. The emitter electrode of this transistor is connected to the emitter circuit of the control transistor 20 across the resistor 46, which serves to develop the required switching potentials thereacross, depending on the state of the control transistor. The collector of the constant current transistor 32 is negatively biased by connection to resistor 56, preferably of the same value as bias resistor 52, and which is connected to V− at terminal 38. Consequently, the lower constant current transistor 32 is non-conductive when the control signal $E_c$ is at zero potential and the control transistor 20 is non-conductive, placing the emitter potential at or near ground, and thus in this condition serves to isolate the output transistor 28 from the control transistor 20. When the control signal $E_c$ is at its positive potential and control transistor 20 is conductive, a positive potential develops across emitter resistor 46 which is sufficient to forward bias the emitter-base junction of the lower constant current transistor 32, making this transistor conductive.

The current control means, previously mentioned as including the constant current transistors 30 and 32, selectively provides substantially constant currents to either one or the other of the two output transistors 26 and 28, so that forward currents are produced across the base-emitter and base-collector junctions of the particular one of these transistors that is in the conductive or ON condition, these forward currents producing substantially balanced voltage drops across each junction. More particularly, both output transistors 26 and 28 preferably have substantially the same characteristics. The output or collector electrodes of the constant current transistors 30 and 32 are respectively connected to the control or base electrodes of the output transistors 26 and 28, both of the output transistors in the illustrated embodiment being of the NPN type. The output or emitter electrodes are each connected in common and to the output terminals 16 of the switch, and the input or collector electrodes are each connected to respective input terminals 12 and 14, the latter being grounded. A load resistance 58 is shown connected across the output terminal 16 to ground. This load resistance 58 may typically represent the input impedance of an amplifier or a leg of a ladder-type digital-to-analog converter (for example, of the type disclosed in U.S. Pat. 2,718,634). In the latter case, the other end of load resistance 58 would be at some potential other than ground. However, in any case, the load presents a higher impedance than the input of source $E_1$ applied to the input terminal 12, $E_1$ being desirably of relatively low impedance to permit the flow of forward base-collector junction current in the output transistor 26.

Clamping means are provided for limiting the voltage across the output and control electrodes of the output transistors 26 and 28 when each is in its non-conductive condition, so that bi-polar electrical inputs, e.g., as shown applied to input terminal 12, may be applied to the output transistors without producing an excessive reverse junction voltage across the output and control electrodes and a forward voltage across the input and control electrodes of the non-conductive transistor, thereby enabling the switching circuit to effectively switch such bi-polar signals. In this regard, a generally symmetrical network is formed by uni-directional clamping diodes 60 and 62, voltage-breakdown diode 64 (illustrated in the embodiment of FIG. 2 as a Zener diode), and current limiting or return resistor 66 acting in conjunction with the biasing resistors 52 and 56. More particularly, the Zener diode 64 has its cathode connected to the junction of the emitters of output transistors 26 and 28, and its anode connected to the negative voltage source V− through limiting resistor 66, which is preferably of equal resistance to biasing resistors 52 and 56. Clamping diodes 60 and 62 each have their anodes connected to the anode of the Zener diode 64 and their cathodes connected to the base of each respective output transistor, 26 and 28. Biasing resistors 52 and 56 serve as alternate return-current paths for the upper and lower (as shown) clamping diodes 60 and 62 associated, respectively, with each of the output transistor 26 and 28.

More specifically, when the control signal $E_c$ is at zero potential, the control transistor 20 is maintained in its normally non-conductive or OFF state and the emitter-base junction of constant current transistor 30 is forward-biased, as previously indicated, supplying a substantially constant direct current to the base of output transistor 26. The upper clamping diode 60 is reverse biased and non-conductive. The forward junction currents in output transistor 26 produced by the constant base current thereto flows respectively into the collector and emitter circuits of this transistor, with a relatively small portion of the current flowing in the emitter circuit, and the remaining and major portion flowing in the collector circuit. Substantially all of the emitter current flows through the Zener diode 64 to the negative source V−. The Zener current, however, divides into two branches, one portion flowing through the return or limiting resistor 66 and the other portion flowing through the lower or forward-biased diode 62 and the bias resistor 56. A constant or fixed voltage is obtained across the Zener diode 64, and the lower diode 62 clamps the base of output transistor 28 to a fixed voltage relative to the emitter to prevent the reverse base-emitter voltage rating from being exceeded as the input signal $E_1$ varies or increases in the positive direction. The negative base voltage supplied to output transistor 28 is of sufficient magnitude to permit the input signal $E_1$ to swing in the direction of negative polarity to the desired amplitude without this transistor 28 becoming conductive due to forward biasing of its base-emitter junction.

When the switching control signal $E_c$ goes to its positive value, being typically a step function as shown, the negative bias on the base of control transistor 20 is overcome and the transistor switches to its ON condition, as previously indicated. The clamping diode 54 then becomes forward biased and clamps the base-emitter voltage of constant current transistor 30 in the reverse direction to cut off this transistor, and consequently the output transistor 26.

Thus, the current which was flowing to the emitter of the upper constant current transistor 30 now flows through the control transistor 20 and the lower constant current transistor 32 to the base of the output transistor 28. The biasing resistor 42 in the collector circuit of the control transistor 20 is selected to fix the constant base current flowing to output transistor 28 to a value which is the same as the base current flowing to the other output transistor 26 when the switching circuit is in the opposite condition.

The base current to output transistor 28 now functions in the same manner as previously described in connection with the other output transistor 26, a small or minor portion flowing through the emitter circuit and the remaining and major portion flowing through the collector circuit to ground. Substantially the entire emitter current flows through the Zener diode 64 as before, and since the collector biasing resistors 52 and 56 are of the same value, and since the Zener current is determined now primarily by the parallel combination of the limiting resistor 66 and the biasing resistor 52, the Zener current will now be essentially the same as that flowing with the output transistor 26 conducting, where the Zener current was determined by the limiting resistor 66 and the biasing resistor 56. Clamping diode 60 now clamps the base of output transistor 26 to a fixed potential relative to its emitter, in the manner of clamping diode 62 and output transistor 28 when the circuit is in its opposite condition, but in this case the base-collector junction of output transistor 26 is prevented from being forward biased to conduction by negatively increasing values of the input signal $E_1$. The Zener voltage is desirably slightly greater than the maximum absolute value of the input signal $E_1$ to insure this condition. Since the input signal is provided at the collector of the output transistor 26, a relatively large positive excursion of the signal is permitted, as long as it does not exceed the reverse voltage rating of this junction.

In either condition of the switching circuit, i.e., with either output transistor 26 conductive and the output transistor 28 non-conductive or vice versa, the magnitude of the base current in the conductive transistor produces forward junction currents which provide substantially balanced voltage drops across each junction, and consequently, the total voltage change of the input signal $E_1$ at the output terminal 16 will be very small as compared with the average value of the input signal, since the junction voltage drops are substantially equal and of opposite sign.

An example of one specific construction of the preferred embodiment shown in FIG. 2 has been built utilizing substantially the following circuit values and perameters:

| | |
|---|---|
| Resistor **34** | 470 ohms. |
| Resistor **36** | 20K. |
| Resistor **40** | 1.5K. |
| Resistor **42** | 510 ohms. |
| Resistor **46** | 1.5K. |
| Resistor **48** | 2.7K. |
| Resistor **50** | 1.6K. |
| Resistor **52** | 39K. |
| Resistor **55** | 510 ohms. |
| Resistor **56** | 39K. |
| Resistor **58** | 7.5K. |
| Resistor **66** | 39K. |
| Diode **54** | 1N914. |
| Diode **60** | 1N914. |
| Diode **62** | 1N914. |
| Zener diode **64** | 1N751. |
| Transistor **20** | 2N3642. |
| Transistor **26** | 2N3642. |
| Transistor **28** | 2N3642. |
| Transistor **30** | 2N3638. |
| Transistor **32** | 2N3638. |
| V+ | +20 v. D.C. |
| V− | −20 v. D.C. |
| $E_c$ | 0 and +3.5 v. |
| $E_1$ | −4 v. to +4 v. |
| $E_2$ | 0 v. (grounded). |

It has been found that in the operation of the above-specified construction, with the control signal $E_c$ at +3.5 volts (output transistor 26 OFF, output transistor 28 ON), and with the excursion of the input singal $E_1$ between −5.079 volts and +5.411 volts, the average maximum offset voltage produced was only 0.001 volt. With the opposite circuit condition (output transistor 26 ON, output transistor 28 OFF), and the excursion of the input signal $E_1$ between −5.015 volts and +5.537 volts, the average maximum offset voltage produced was only 0.002 volt. As can be seen by comparison of these applied signal voltages with those previously listed, these results were produced under conditions more severe than those in normal or conservative circuit operation with the components specified. Thus, as shown, the low and essentially constant value of the offset voltage of the transistor switch, in accordance with the principles of the present invention, is provided whether the input signal is bi-polar or unipolar and even through currents up to typically 1 ma. are delivered to or accepted from the load.

Constancies of base, collector, and emitter currents are, of course, important for constancy of minute offset voltages, and in the present embodiment, the transistors are desirably of the silicon type to reduce the effects of thermally-generated currents to the point of insignificance.

An additional advantage of compactness is provided by the circuit of FIG. 2 in that a single "dual transistor" may be used for the output transistors 26 and 28 due to their desirably identical operating characteristics. Further, the circuit as a whole readily lends itself to integrated circuit technique and microminiaturization, in which case the references to the schematically illustrated separate transistors in FIG. 2 refer to the functionally equivalent regions of the integrated circuit structure.

It will, of course, be understood that modifications of the present invention, in its various aspects, will be apparent to those skilled in the art, some being apparent only after study, and others being merely matters of routine electronic design. As such, the scope of the invention should not be limited by the particular embodiment and specific construction herein described, but should be defined only by the appended claims, and equivalents thereof.

Various features of the invention are set forth in the following claims.

What is claimed is:

1. A switching circuit comprising: two-state switching means responsive to a control signal selectively determining the state of said switching means; first and second junction transistors having input, output and control electrodes; circuit means, including said input electrodes, for coupling each one to respectively first and second electrical inputs; means coupling each of the output electrodes together to form a common output from said switching circuit; current control means responsive to said switching means for providing a substantially constant current through the control electrode of the first transistor and driving it into conduction only when said switching means is in one of said states, and through the control electrode of said second transistor only when said switching means is in the other of said states, said first and second transistors being alternately non-conductive when the switching means is in the opposite of said states; and said current control means providing forward currents across both of the junctions of the conductive transistor and substantially balanced voltage drops thereacross, so that the voltage difference of the input and output electrodes of the conductive transistor of said switching circuit is minimized when the electrical inputs are applied.

2. The circuit of claim 1 comprising clamping means for limiting the voltage across the output and control electrodes of said transistors when each is in its non-conductive condition, so that bi-polar electrical inputs may be applied thereto without producing an excessive reverse junction voltage across the output and control electrodes or a forward voltage across the input and control electrodes of the non-conductive transistor.

3. The circuit of claim 2 wherein said clamping means comprises a voltage-breakdown diode serially connected with a unidirectional diode across the output and control electrodes of both said transistors, the unidirectional diodes being coupled to the control electrode of each transistor and being conductive only when the respective transistor is non-conductive.

4. The circuit of claim 3 wherein said voltage-breakdown diode has a fixed voltage thereacross which is at least slightly greater than the maximum absolute value of the electrical input applied to the switching circuit.

5. The circuit of claim 1 comprising means for supplying a bias potential on the control electrode of at least one of said transistors of sufficiently large magnitude of a given polarity to maintain the transistor non-conducting with variation of the electrical input to the other transistor in the direction of increasing magnitude of the same polarity.

6. The circuit of claim 1 wherein said current control means comprises third and fourth transistors, each having input and output electrodes in the constant current supply circuit to the control electrodes of said first and second transistors, and means coupling said third and fourth transistors to said switching means for making each alternately conductive.

7. The circuit of claim 1 wherein said first and second transistors have substantially identical electrical characteristics.

8. The switching circuit of claim 1 wherein said two-state switching means comprises means for maintaining the condition thereof in said one state in response to a control signal of a first D.C. potential and in said other state in response to a control signal of a second D.C. potential.

References Cited

UNITED STATES PATENTS

| | | | |
|---|---|---|---|
| 3,112,410 | 11/1963 | Schmid. | |
| 3,359,433 | 12/1967 | Thauland | 307—255X |
| 3,399,354 | 8/1968 | Sodtke | 330—17X |
| 3,241,013 | 3/1966 | Evans | 307—239 |

DONALD D. FORRER, Primary Examiner

B. F. DAVIS, Assistant Examiner

U.S. Cl. X.R.

307—239, 243

UNITED STATES PATENT OFFICE
CERTIFICATE OF CORRECTION

Patent No. 3,548,217 Dated December 15, 1970

Inventor(s) James E. Moore

It is certified that error appears in the above-identified patent and that said Letters Patent are hereby corrected as shown below:

Column 1, line 4 - for "Stromberg Datagraphics, Inc."

read "Stromberg DatagraphiX, Inc."

Signed and sealed this 6th day of April 1971.

(SEAL)
Attest:

EDWARD M.FLETCHER,JR.
Attesting Officer

WILLIAM E. SCHUYLER,JR.
Commissioner of Patents